Figure 1:

United States Patent [19]
Turbak et al.

[11] 4,086,418
[45] Apr. 25, 1978

[54] PROCESS FOR PRODUCING A REGENERATED HOLLOW CELLULOSIC FIBER

[75] Inventors: Albin Frank Turbak, Convent Station; Richard Benjamin Hammer, Morris Plains; Norman A. Portnoy, Hopatcong, all of N.J.; Arthur C. West, St. Paul, Minn.

[73] Assignee: International Telephone and Telegraph Corporation, New York, N.Y.

[21] Appl. No.: 662,134

[22] Filed: Feb. 27, 1976

[51] Int. Cl.$^2$ ............................................. C08B 16/00
[52] U.S. Cl. ...................................... 536/30; 264/183; 264/187; 264/188; 264/209; 536/35; 536/57
[58] Field of Search ...................... 536/30, 32, 35, 57; 428/398; 264/183, 187, 188, 209

[56] References Cited

U.S. PATENT DOCUMENTS

| | | | |
|---|---|---|---|
| 2,780,512 | 2/1957 | Inoshita | 264/188 |
| 3,087,775 | 4/1963 | Reinhardt et al. | 536/30 |
| 3,236,669 | 2/1966 | Williams | 536/57 |
| 3,423,491 | 1/1969 | McLain et al. | 536/30 |
| 3,702,843 | 11/1972 | Schweiger | 536/35 |

*Primary Examiner*—Ronald W. Griffin
*Attorney, Agent, or Firm*—J. B. Raden; H. J. Holt

[57] ABSTRACT

Hollow cellulosic fibers are produced by nitrosating and dissolving a cellulosic material in an aprotic solvent selected from the group consisting of a dialkylacylamide and dimethylsulfoxide and regenerating the dissolved cellulose by contacting the cellulose solution with a regenerant. The regenerant is n-octanol where the solvent is a dialkylacylamide and n-hexanol where the solvent is dimethylsulfoxide. The fibers are hollow as regenerated and require no special spinnerette designs nor special spinning conditions.

8 Claims, 2 Drawing Figures

FIG. 2

PROCESS FOR PRODUCING A REGENERATED HOLLOW CELLULOSIC FIBER

This invention relates to a process for producing a regenerated hollow cellulosic fiber and to the fibers produced therefrom.

The use of organic solvent systems for dissolving cellulose and producing regenerated cellulosic products is known. One such organic solvent system having considerable promise consists of a dimethylformamide solvent and dinitrogen tetroxide as a nitriting or nitrostating agent. In such a system, the cellulose is regenerated from the organic solvent by contact with a non-solvent for the cellulose such as water or a lower alcohol. Such a system is shown, for example, in Canadian Patent No. 899,559, which issued on May 9, 1972. The literature has also reported the use of dimethylsulfoxide and nitrogen dioxide as a solvent for cellulose and its regeneration from aqueous mediums containing a variety of salts or organic liquids including lower alcohols. See, for example, U.S. Pat. No. 3,236,669 and Canadian Patent No. 786,225. However, the prior art contains essentially no disclosure of fiber properties or configurations nor does the prior art disclose processes for controlling the cross-sectional configuration of fibers obtained from these organic solvent systems.

It is known that hollow filaments may be produced from non-cellulosics using melt spinning techniques with specially shaped spinnerettes. Cellulosic fibers—viscose and acetate—with hollow or other irregular cross-sections have been reportedly produced by the addition of low boiling solvents or gas producing materials to either the cellulosic solutions or to the spin baths, by adjusting the spinning conditions or by the use of special spinnerette designs. To our knowledge, no one has however, prepared fibers of pure cellulose which are hollow in cross-sectional configuration solely by control of the coagulation-regeneration system and without the necessity of modifiers or special spinnerettes or special spinning techniques.

It is accordingly a primary object of the present invention to provide a process for producing hollow regenerated cellulosic fibers.

It is an additional object of this invention to provide a process for producing hollow regenerated cellulosic fibers having properties which are comparable to solid fibers by a process which does not use or require special spinnerettes, special spinning techniques or additional process modifications beyond those normally used for solid fibers.

It is a further object of this invention to provide a regenerated cellulosic fiber in the form of a hollow fiber.

It has now been found that hollow fibers may be produced by spinning an organic solvent cellulosic solution into certain regenerants, n-octanol where the solvent is dialkylacylamide, and n-hexanol where the solvent is dimethylsulfoxide. The configuration is believed due to control of the reactivity and diffusibility of the coagulant (which is also the regenerant) by the initially formed skin of the solvent spun fiber and is totally unexpected in view of prior experience in this field. Other homologous alcoholic coagulants do not produce fibers of hollow shape. The hollow fibers possess a number of uses, for example as selective membranes for dialysis as in kidney machines and reverse osmosis water purifiers. In most instances, the hollow fibers are in the form of segmented hollow fibers, the segments being of varying length. The size of the lumen and length and frequency of the segments can be controlled by the addition of certain modifiers to the alcohol coagulant. The fibers of the present invention have been found to have essentially the same strength as solid fibers spun from a similar organic solvent system but utilizing a coagulant which produces a solid fiber. The equivalent properties are believed to be based upon the fact that the strength of solvent spun fibers results from the skin orientation rather than from the presence or absence of a core. The physical properties of hollow rayon fibers reported in the prior art are significantly lower than the corresponding solid core fibers.

In the practice of the invention, the cellulosic material is first nitrosated and dissolved in an aprotic solvent. This may be done by adding the cellulose material to the solvent and then feeding nitrogen dioxide, or its dimer, dinitrogen tetroxide, into the mixture while stirring and preferably while cooling. Alternatively, the nitrostating agent is mixed with the solvent and the cellulose then added. Analytical studies have indicated that the process of dissolution involves a reaction of nitrogen dioxide or other nitrostating agent with cellulose to form a solvent soluble cellulose nitrite ester. Where the solvent is dimethylsulfoxide, dissolution is assisted by the presence of from 0.6 to 0.8% water.

Where the aprotic solvent is a dialkylacylamide, it may be N,N-dimethylformamide (DMF) or N, N-dimethyl- or N, N-diethylacetamide. The solvent should be capable of dissolving the nitrited cellulose without substantial depolymerization of the cellulose.

A wide variety of cellulosic sources may be used such as chemical pulps, either sulfite or kraft, bleached or unbleached. Cotton linters, reprocessed cellulose and purified bast fibers are other typical sources of cellulose. About 5 to 14 grams of cellulose for 100 grams of solution should typically be used, preferably from 6 to 12 grams per 100 grams of solution. The concentrations will vary with the degree of polymerization (DP) of the cellulose, lower concentrations being used for higher DP's. The cellulosic pulp will normally vary from 250 to 1000 DP, a range of 300 to 800 being preferred.

The nitrosating agent is normally used in stoichiometric excess. The nitrosyl group is preferably added as $NO_2$ or its dimer $N_2O_4$, but may also be other oxides such as $N_2O_3$ or $N_2O_5$ or other nitrosating species such as nitrosyl chloride. Slightly greater than 3 moles of the nitrosating agent should be added per mole of anhydroglucose unit in the cellulose.

To obtain lowest caustic extractability properties in the fibers—a desirable goal to avoid damage during normal alkaline laundering or mercerizing of cellulosic fabrics—the nitrosating agent should preferably be added and dissolution should occur at a temperature below 20° C and the storage time subsequent to dissolution and prior to coagulation or regeneration should be as brief as possible and before any significant oxidation of the cellulose takes place. In the case of a dialkylacylamide as the aprotic solvent, the temperature of dissolution should be no greater than 20° C and preferably less than 10° C. Where the aprotic solvent is dimethylsulfoxide, the $N_2O_4$ is preferably premixed with the dimethylsulfoxide to lower the freezing temperature of the latter. The temperature is then reduced to 20° C or less, preferably about 9° C, and the cellulose added, against maintaining the temperature below 20° C during dissolution of the cellulose. Reference to a more complete description of this aspect of the process with respect to dialkylacylamide solvents may be found in co-pending application Ser. No. 662,132, filed of even date herewith.

Control of the lumen size and segment spacing is possible by changing the cellulose solids content of the solution and by the addition of certain modifiers to the coagulant/regenerant. Increasing the solids content of the solution reduces the size of the lumen and the segment frequency. The addition of a base to the regenerant which is soluble in the regenerant and reactive with the nitric acid introduced into the regenerant during coagulation and regeneration, also reduces segment frequency and acts to increase lumen size. The base may be added in amounts ranging up to 25% by weight of the regenerant, preferably from about 5-15% by weight. Examples of useful reactive bases which are soluble in octanol and hexanol are the corresponding alkoxides produced by addition of an alkali or alkaline earth metal into an excess of the respective alcohol. Certain salts which have a high solubility in the dialkylacylamide solvent can be added to the alcohol regenerant to alter the removal of the solvent from the center of the fiber by osmotic interaction and thus effect the size of the lumen and fiber wall. Examples of such salts are calcium, aluminum, sodium and nickel nitrate and sodium and potassium thiocyanate. The salts may be added in an amount up to 25% by weight of the regenerant. Similarly, the use of an excess amount of $N_2O_4$ above that actually required for dissolution causes change in the lumen size and fiber wall thickness.

The solution will normally be spun into a primary coagulation bath, the coagulated fiber passed to a primary godet, then through a secondary bath to a secondary godet, whose speed can be altered to produce the desired degree of stretch. Additional godets and/or coagulant baths may be used to introduce further stretch and complete the regeneration. The alcohol coagulants of the invention are used for both coagulation and ultimate regeneration of the fibers. Where more than a single bath is used, the bath may consist of the same or different coagulants. Unless otherwise indicated, reference herein to the coagulant or regenerant identifies the primary bath.

The following examples are illustrative of the practice of the invention. Unless otherwise indicated, all parts are by weight.

EXAMPLE 1

A prehydrolyzed kraft pulp having a DP of 1050 was alkaline aged to a DP level of 450, neutralized, washed, dried, then fluffed and defibered by means of a rotary cutter. A cellulose solution containing 8 parts of cellulose, 25 parts of $N_2O_4$ and 67 parts of DMF was prepared by charging 160 grams of the alkali aged prehydrolyzed kraft pulp (DP 450) and 1340 grams of dimethylformamide (DMF) into a two-liter four neck resin reaction flask equipped with a stainless-steel mechanical stirrer, thermometer, and a 250 ml equalizing pressure addition funnel. The resulting slurry was stirred and 500 grams of liquid nitrogen tetroxide ($N_2O_4$) was added dropwise over ca. 60 minute time period. The solution was deaerated and vertically spun using a glass 300 hole (0.0025 inch) spinnerette. The fiber tow was passed through a primary bath of octanol at 15° C, then through a secondary bath of water at 22° C. The fiber tow was cut from the take up godet, cut into staple fiber lengths, neutralized with bicarbonate, washed with water, finished with a 0.3% lubricating finish, air dried and carded. Godet stretch was 100% (As used in this and the following examples, godet stretch is the difference between the circumferential speed of the initial and final godet, divided by the speed of the initial godet, times 100.) The fiber produced was hollow and segment frequency was 25 nodules per inch. The fibers had tenacities of 2.25 g/d (cond.) and 0.96 g/d (wet), elongations of 8.65% (cond.) and 15.95% (wet) for a 1.21 denier filament of 0.38 wet modulus.

EXAMPLE 2

Figure 2:
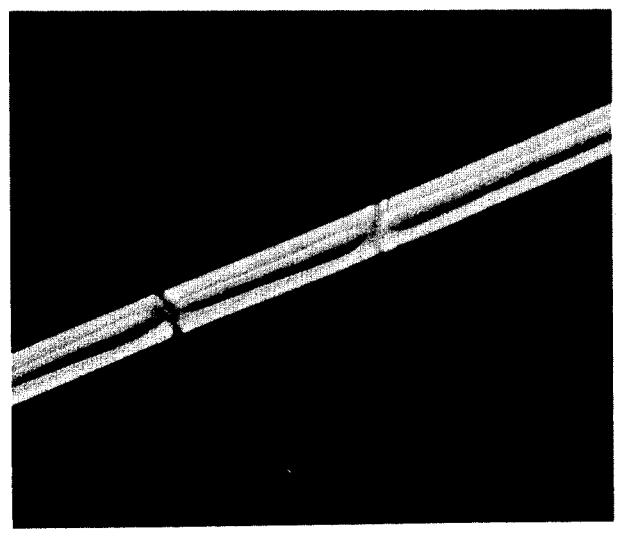

A fiber was produced as set forth in Example 1 but using an 8/15/77 composition dope (8 parts cellulose, 15 parts $N_2O_4$, 77 parts DMF). The godet stretch was 93%. The fiber was again hollow and had a segment frequency of 5 nodules per inch. An actual photomicrograph of the hollow fiber is shown in FIG. 1 in cross-section and is shown longitudinally in FIG. 2. The fibers had the following properties:

| Tenacity | (cond.) | 2.29 | g/d |
| --- | --- | --- | --- |
|  | (wet) | 1.23 | g/d |
| Elongation | (cond.) | 13.2 | % |
|  | (wet) | 20.0 | % |
| Wet Modulus |  | 0.37 | g/d |
| Denier |  | 1.6 |  |

EXAMPLE 3

Example 2 was repeated but in this example, 20% of Ca$(NO_3)_2 \cdot 4H_2O$, by total weight of the coagulant, was added to the octanol. Again a hollow fiber was obtained but with a thicker wall and an improved wet modulus as compared to Example 2. The fibers had the following properties:

| Tenacity | (cond.) | 2.32 | g/d |
| --- | --- | --- | --- |
|  | (wet) | 1.35 | g/d |
| Elongation | (cond.) | 13.4 | % |
|  | (wet) | 15.1 | % |
| Wet Modulus |  | 0.55 | g/d |
| Denier |  | 1.5 |  |

EXAMPLE 4–7

Four fiber samples were prepared from two different dope compositions — the first an 8/15/77 composition; the second a 10/19/71 composition and from two different regenerant systems. Both regenerant systems were octanol except that one contained a reactive base — 10% by weight of the coagulant of sodium octoxide. All four samples produced hollow fibers. The higher solids composition (10/19/71) decreased the size of the lumen and the wall thickness and produced a more continuous hollow fiber than the lower percent solids composition. The addition of sodium octoxide increased the continuity of the hollow portion of the fiber (decreased the segment frequency), increased the size of the lumen and decreased the wall thickness. The properties of the four fiber samples are set forth in Table I.

EXAMPLE 8

An 8/15/77 cellulose solution was prepared from 80 grams of prehydrolyzed kraft pulp aged to a DP of 450 and containing 0.6–0.7% water, 150 grams of $N_2O_4$, 770 grams of dimethylsulfoxide (DMSO) and 1.50 grams of water. The liquid $N_2O_4$ was added to the DMSO, then the water and finally the cellulose. This was stirred at 23° C for 16 hours to give a clear viscous solution. The solution was deaerated under vacuum and spun with a 300 hole glass spinnerette with 0.0025 inch hole size into a hexanol primary bath. The tow was spun vertically from the primary coagulation bath at ambient temperature with two inch bath travel length. A 12 inch water secondary bath was located between the primary and secondary godet and maintained at 20° C. All fibers were processed as staple with 95° C. 6% NaHCO₃, rinsed with 50° C. water, 0.3% lubricating finish at 50° C., centrifuged, oven-dried at 100° C. and carded. Godet stretch was 71.2%. Results are shown in Table II.

TABLE I

| Example | DOPE COMPOSITION | DENIER | TENACITY COND. | (g/d) WET | ELONGATION COND. | (%) WET | WET* MODULUS, g/d |
| --- | --- | --- | --- | --- | --- | --- | --- |
| 4 | Octanol | 8/15/77 | 1.81 | 1.93 | 1.13 | 9.59 | 19.06 | 0.50 |
| 5 | Octanol | 10/19/71 | 2.12 | 1.78 | 0.81 | 14.23 | 27.45 | 0.27 |
| 6 | Octanol With 10% NaOC₈H₁₇ | 8/15/77 | 1.22 | 2.05 | 1.19 | 8.38 | 14.88 | 0.53 |
| 7 | | 10/19/71 | 2.06 | 1.85 | 0.84 | 11.53 | 20.87 | 0.32 |

*Tenacity at 5% Wet Elongation.

TABLE II

| Example | Denier | Tenacity, g/d Cond. | g/d Wet | Elongation, Cond. | % Wet | Wet Modulus, g/d |
| --- | --- | --- | --- | --- | --- | --- |
| 8 | 0.55 | 1.94 | 0.77 | 4.6 | 5.9 | 0.55 |
| 9 | 1.38 | 1.56 | 0.90 | 7.9 | 17.3 | 0.26 |
| 10 | 1.25 | 1.88 | 0.80 | 3.9 | 9.7 | 0.43 |

EXAMPLES 9 and 10

Two 6/11/83 solutions were prepared as in Example 8. Fibers were spun and processed as in Example 8. Godet stretch was 25.8% for Example 9, 29.7% for Example 10.

Table II shows the properties of fibers spun in accordance with Examples 8-10 from a dimethylsulfoxide solvent. All examples produced hollow filament fibers, although properties were better with the less viscous solution of Examples 9 and 10 which presented fewer spinning difficulties.

Fibers were also prepared from a large number of coagulants outside the scope of the invention, including other monohydric alcohols. Specifically, methanol, ethanol, isopropanol, cyclohexanol and water coagulants all produced solid fibers prepared from dopes in which dimethylformamide was the solvent. Similarly, water, isopropanol, methanol and octanol coagulants produced either solid fibers or fibers of inadequate physical properties from dopes in which dimethylsulfoxide was the solvent. No coagulant other than octanol produced a hollow fiber from dialkylacylamide solvents and no coagulant other than hexanol produced a hollow fiber from a dimethylsulfoxide solvent.

We claim:

1. A process for producing a regenerated hollow cellulosic fiber comprising nitrosating cellulose with a nitrosating agent selected from the group consisting of an oxide of nitrogen and nitrosyl chloride and dissolving the cellulose in an aprotic solvent selected from the group consisting of a dialkylacylamide and dimethylsulfoxide and regenerating the dissolved cellulose by contacting the cellulosic solution with a regenerant, said regenerant being n-octanol where the solvent is a dialkylacylamide and n-hexanol where the solvent is dimethylsulfoxide.

2. The process of claim 1 in which nitrosation and dissolution occurs at a temperature below 20° C.

3. The process of claim 1 in which the solvent is dimethylsulfoxide and the regenerant is n-hexanol.

4. The process of claim 3 in which the nitrosating agent is premixed with the solvent, the temperature lowered to below 20°, the cellulose added and the temperature maintained at less than 20° during dissolution.

5. The process of claim 1 in which the solvent is a dialkylacylamide and the regenerant is n-octanol.

6. The process of claim 5 in which the solvent is dimethylformamide.

7. The process of claim 5 in which a base is added to the regenerant which is soluble in the regenerant and reactive with nitric acid introduced therein during regeneration.

8. The process of claim 5 in which a salt of high solubility in the solvent is added to the regenerant to control the size of the lumen and fiber wall of the fiber.

* * * * *